United States Patent
Taylor

(10) Patent No.: US 7,472,528 B2
(45) Date of Patent: Jan. 6, 2009

(54) VACUUM BELT ASSEMBLY TO DRIVE TUBULAR BAG MATERIAL

(75) Inventor: Alfred Alexander Taylor, Lugarno (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 0 days.

(21) Appl. No.: 11/178,150

(22) Filed: Jul. 8, 2005

(65) Prior Publication Data
US 2006/0016160 A1 Jan. 26, 2006

(30) Foreign Application Priority Data
Jul. 21, 2004 (AU) ............................. 2004904029

(51) Int. Cl.
*B65B 9/06* (2006.01)

(52) U.S. Cl. .............................. 53/551; 53/451; 53/550

(58) Field of Classification Search ................... 53/551, 53/451, 550
See application file for complete search history.

(56) References Cited

U.S. PATENT DOCUMENTS

| | | | |
|---|---|---|---|
| 3,915,291 A | * | 10/1975 | Vogts ....................... 198/626.1 |
| 4,136,505 A | | 1/1979 | Putnam, Jr. et al. |
| 4,288,965 A | * | 9/1981 | James .......................... 53/451 |
| 4,532,753 A | * | 8/1985 | Kovacs ........................ 53/451 |
| 4,578,931 A | * | 4/1986 | Roovers ....................... 53/551 |
| 4,800,707 A | | 1/1989 | Rabus |
| 4,840,012 A | * | 6/1989 | Boeckmann ................. 53/410 |
| 4,910,943 A | * | 3/1990 | Taylor et al. ................. 53/551 |
| 5,125,217 A | * | 6/1992 | Fukuda ........................ 53/551 |
| 5,715,656 A | * | 2/1998 | Pearce ......................... 53/451 |

FOREIGN PATENT DOCUMENTS

EP    0 469 818 A3    2/1992

* cited by examiner

*Primary Examiner*—Hemant M Desai
(74) *Attorney, Agent, or Firm*—Townsend and Townsend and Crew, LLP

(57) ABSTRACT

A vacuum belt assembly (10) to drive tubular bag material (11) through a packaging machine. The assembly (10) includes three belts (19, 20, 21) with the belts (19, 20, 21) being driven by rollers (22). The belts (20, 21) have respectively lengths (28, 29) being located in planes inclined by an angle greater than 0° but less than 180°, preferably an obtuse angle.

6 Claims, 2 Drawing Sheets

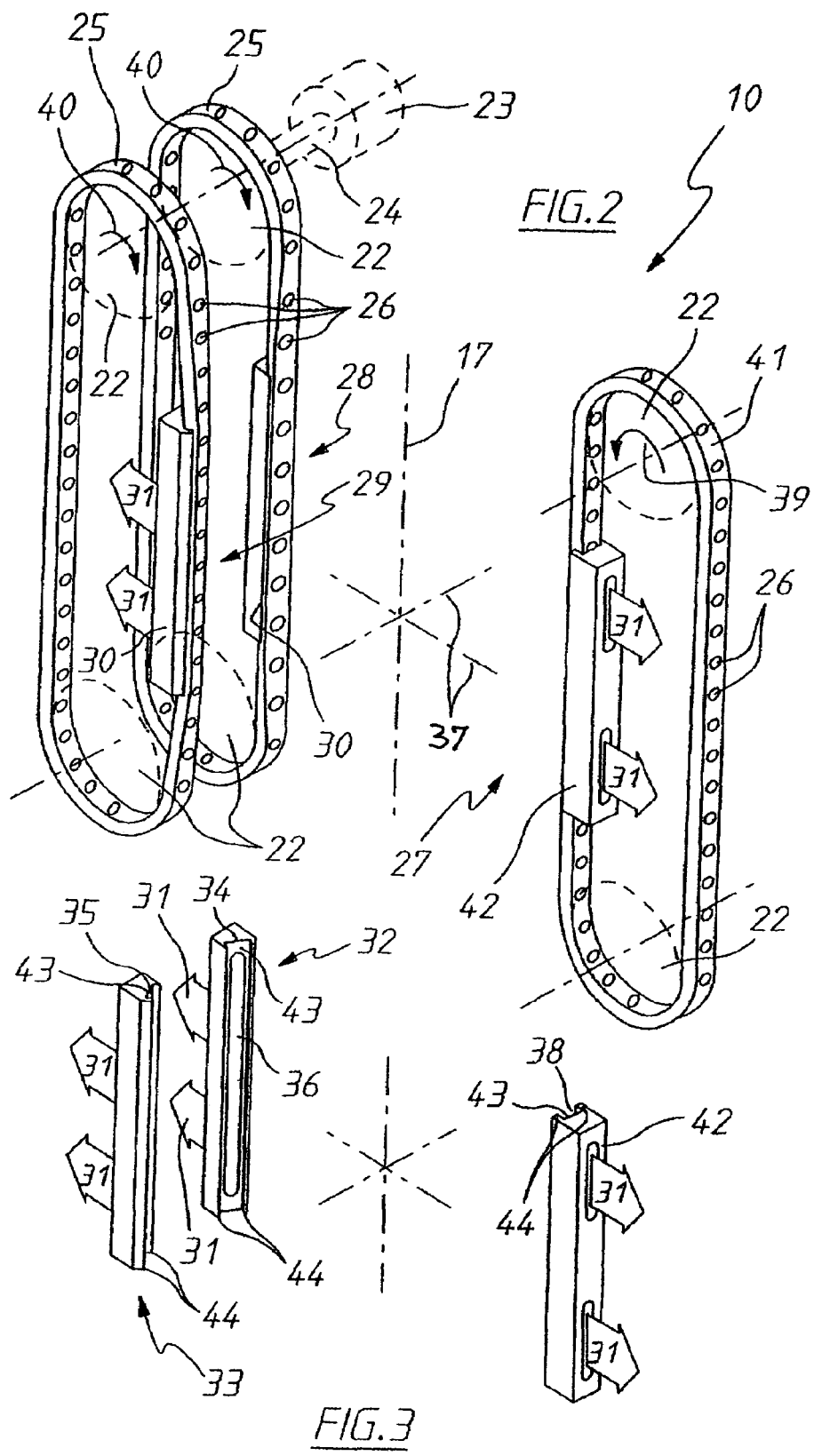

VACUUM BELT ASSEMBLY TO DRIVE TUBULAR BAG MATERIAL

TECHNICAL FIELD

The present invention relates to a vacuum belt assembly to drive tubular bag materials through a packaging machine.

BACKGROUND OF THE INVENTION

In packaging machines, such as packaging machines employed to package snack foods, strip bag material is delivered to a former which configures the strip bag material into a tubular configuration. The tubular bag material is longitudinally sealed adjacent its longitudinal edges so that it maintains a tubular configuration, with product being delivered to the interior of the tubular bag material through the former. The tubular bag material is subsequently engaged by sealing jaws that transversely seal the tubular bag material and transversely cut the tubular bag material so that discrete bags of product are provided. The tubular bag material is moved through this apparatus by belts or rollers to which a vacuum is applied. Apertures in the belts or rollers are positioned against the tubular bag material so that the tubular bag material is urged into contact therewith due to the reduced air pressure applied to the surfaces of the tubular bag material engaged by the belt or rollers.

Examples of the above-described packaging apparatus are described in U.S. Pat. Nos. 4,753,336 and 4,663,917, while a previous assembly to drive the tubular bag material through the packaging machine is described in U.S. Pat. No. 4,910,943.

Typically two or three belts are provided to drive the bag material. In some instances two of the belts are located adjacent each other so that the longitudinal edges of the tubular bag material are positioned therebetween, with the overlapping edges being engaged by a backseal bar assembly that heats the tubular bag material to longitudinally seal the bag material. Typically, an inner support is located in the interior of the tubular bag material and against which the tubular bag material is pressed by the backseal bar assembly. The belts are driven and are supported by rollers that have a rotational axis that is generally horizontal, with the tubular bag material having a longitudinal axis that is generally vertical. Each belt has an engaging length that engages the tubular bag material, with the engaging lengths being generally planar and located in the same plane. The tubular bag material is also engaged by a third belt located on the opposite side of the tubular bag material to the backseal bar and again is driven.

In other instances only two belts are used, the belts being located on opposite sides of the bag material.

The above-described belt arrangements have the disadvantage that they change the configuration of the tubular bag material to the extent that it reduces the area available for the product to move when being delivered to the interior of the tubular bag material. Accordingly, movement of the product is inhibited.

OBJECT OF THE INVENTION

It is an object of the present invention to overcome or substantially ameliorate the above disadvantage.

SUMMARY OF THE INVENTION

There is disclosed herein a vacuum belt assembly to drive tubular bag material having a generally central longitudinal axis and passing through a packaging machine, the assembly including:

a first and a second drive belt, each belt having an endless outer surface to engage the tubular bag material, and further having a plurality of passages each extending, from a respective aperture of the respective face, through the belt, with each belt having a length to engage the bag material, with the apertures of the length of the first belt being arranged in a first generally flat plane, and the openings of the length of the second belt being arranged in a second generally flat plane;

a vacuum gallery operatively associated with each length and to apply a vacuum to the length of the first and second belts so that the apertures of the first and second lengths have a reduced air pressure to thereby have the tubular bag material urged in contact with the lengths;

a motor assembly to drive each belt so that the lengths move in unison in the same direction to drive the tubular bag material; and wherein the first and second lengths are generally parallel and the planes are inclined by an angle greater than 0° but less than 180°, the angle being located in an angle plane extending generally normal to the lengths so that the lengths at least partly face each other to engage the tubular bag material.

Preferably, each length includes a portion of the outer face of the respective belt so that there are two length portions, which length portions are generally planar, with the portion at the angle plane being generally perpendicular to a radius of the longitudinal axis.

Preferably, the assembly includes a guide for each belt length, with each guide engaging its respective length so as to position the outer face portion thereof so as to be generally parallel to the longitudinal axis with the openings thereof in the respective plane.

Preferably, each guide engages its respective belt to cause angular deflection thereof about the longitudinal axis of the belt.

Preferably, each guide includes a slot along which the belt moves, with each length being located in a respective one of the slots so as to be guided thereby.

Preferably, the assembly further includes a third drive belt, the belt having an endless outer surface to engage the tubular bag material, the third belt further having a plurality of passages each extending from an aperture in the outer face of its third belt, and a length to engage the bag material; and a vacuum gallery operatively associated with the length of the third belt and applying a vacuum to the length of third belt so that apertures of the length of the third belt have reduced air pressure so that the bag material is urged into contact with the length of the third belt, and wherein the third length is generally parallel to the length of the first and second lengths.

BRIEF DESCRIPTION OF THE DRAWINGS

A preferred form of the present invention will now be described by way of example only with reference to the accompanying drawings wherein:

FIG. 2 is a schematic isometric view of the belts employed in the assembly of FIG. 1; and FIG. 3 is a schematic isometric view of guides employed with the belts of FIG. 2.

DETAILED DESCRIPTION OF THE PREFERRED EMBODIMENTS

Figure 1:
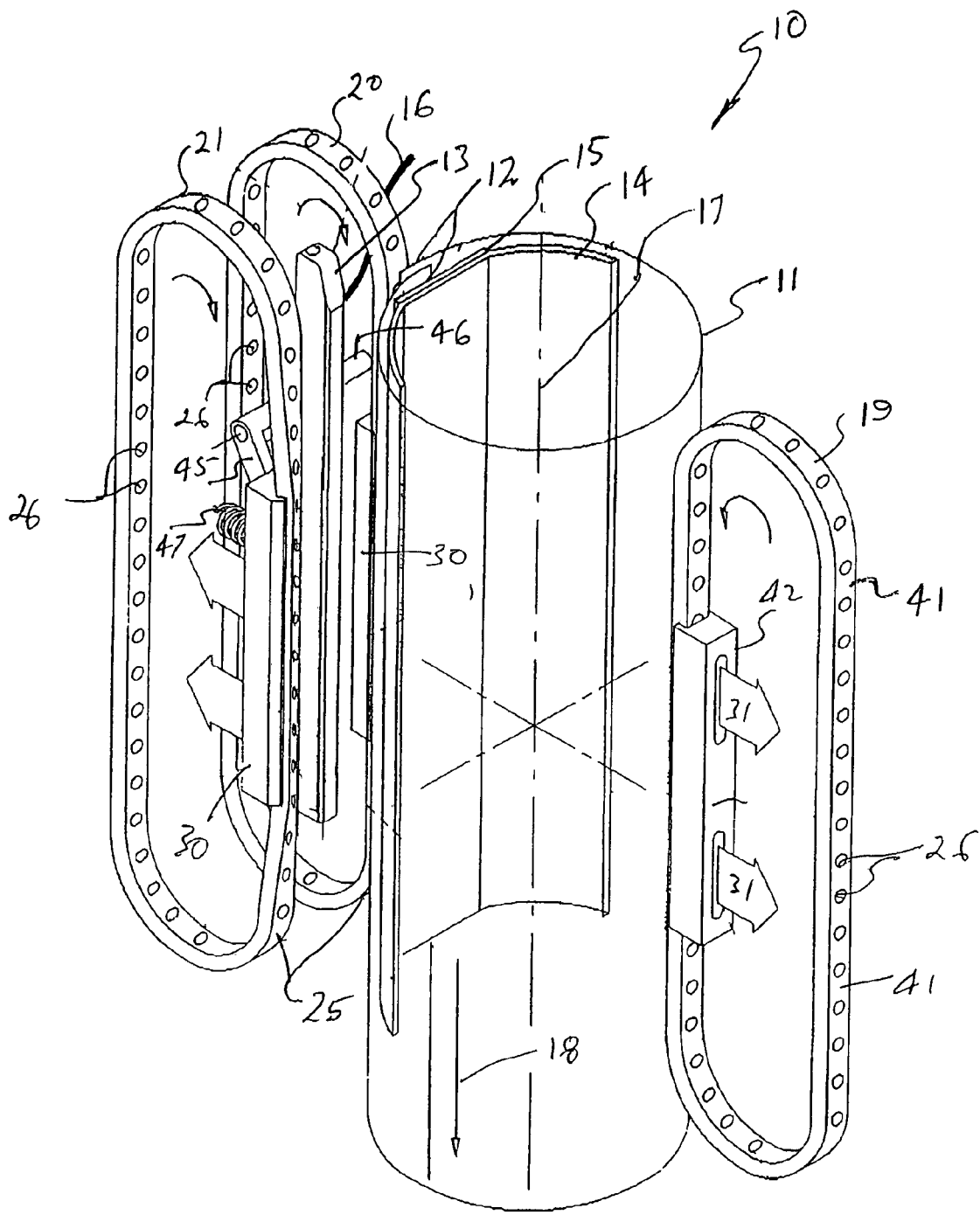
FIG. 1 is a schematic isometric view of a vacuum belt assembly to drive tubular bag material passing through a packaging machine.

In the accompanying drawings, there is schematically depicted a vacuum belt assembly 10 to drive tubular bag material 11 through a packaging machine. The tubular bag material 11 has longitudinally extending overlapping edge portions 12 that are sealed so as to be joined. The edge portions 12 are sealed by a backseal bar 13 that is electrically heated and pressed against the overlapping edge portions 12. More particularly, the edge portions 12 are sandwiched between the backseal bar 13 and an inner support 14 to which a Teflon wear strip 15 is attached. An electric lead 16 delivers electric power to the backseal bar 13.

The tubular bag material 11 has a generally central longitudinal axis 17 that is generally vertical and parallel to the longitudinal axis of the bar 13.

To engage the tubular bag material to move the tubular bag material in the direction of the arrow 18, three belts 19, 20 and 21 are provided, which belts 19, 20 and 21 are supported and driven by rollers 22. At least some of the rollers 22 are driven by a motor 23. The motor 23 is attached to the rollers 22 by means of a shaft 24.

The belts 19, 20 and 21 each have an outer face 25 or 41 that engages the tubular bag material 11. To urge the tubular bag material 11 into friction contact with the faces 25 or 41, the belts 19, 20 and 21 are provided with a plurality of openings 26 that each communicate with passages that extend through the belts 19, 20 and 21.

Each belt 19, 20 and 21 has a respective length 27, 28 and 29 that engages the tubular bag material 11 to cause movement thereof.

Associated with each length 27, 28 and 29 is a vacuum gallery 30 or 42 from which air 31 is withdrawn so that each gallery 30 or 42 has a reduced air pressure. The reduced air pressure is applied to the openings 26, so that the tubular bag material 11 under atmospheric pressure is urged into contact with the lengths 27, 28 and 29.

As is best seen in FIGS. 1 and 2, the lengths 28 and 29 are located on opposite sides of the bar 13 and each have their respective apertures 26 located in a plane, with the plane of the length 28 being inclined to the plane of the length 29 by an angle greater than 0° but less than 180°, preferably an obtuse angle. The obtuse angle being in a horizontal flat plane defined by the axes 37, the plane is generally normal to the longitudinal axis 17. Accordingly, these portions of the faces 25 at the lengths 28 and 29 at least partly face each other so as to engage the tubular bag 11.

The inclination of the lengths 28 and 29 is provided by the guide portions 32 and 33 of the galleries 30. The guide portions 32 and 33 have longitudinal extending guide slots 34 and 35 that cause the belts 20 and 21, engaged with the guide portions 32 and 33, to deform (flex) angularly about their longitudinal axis so as to provide the above-mentioned obtuse angle.

Each gallery 30 and 42 has a longitudinally extending cavity 36 to which the reduced air pressure is applied so that the reduced air pressure is also applied to the openings 26.

The guide 42 is similarly provided with a longitudinal extending slot 38 from which air is withdrawn so that the apertures 26 of the belt 25 similarly have a reduced pressure applied thereto.

The belts 19, 20 and 21 are driven in a direction of the arrows 39 and 40 so that the lengths 27, 28 and 29 move in unison and are generally parallel and co-extensive.

As best seen in FIG. 1 the support 14 extends angularly about the axis 17 so as to be positioned adjacent the lengths 28 and 29.

Each of the slots 34, 35 and 38 is provided with a generally flat guide surface 43, with the surfaces 43 being generally parallel and parallel to the longitudinal axis 17. The surfaces 43 are provided with the cavity 36. The surfaces 43 are bordered by longitudinally extending flanges 44 that engage the longitudinal extending sides of the belts 19, 20 and 21.

The backseal bar 13 is supported by a pivotally mounted arm 45 attached to a shaft 46 that provides for movement of the backseal bar 13. A spring 47 engages the backseal bar 13 to urge it into contact with the edge portions 12.

In the above-described embodiment, the belts 20 and 21 are located adjacent and on opposite sides of the backseal bar 13.

Although the invention has been described with reference to specific examples, it will be appreciated by those skilled in the art that the invention may be embodied in many other forms.

The invention claimed is:

1. A vacuum belt assembly to drive tubular bag material, the bag material having a generally central longitudinal axis and to pass through a packaging machine, the assembly including:

a first and a second drive belt arranged adjacent to each other and extending generally parallel to said axis, each belt having an endless outer face to engage the tubular bag material and a plurality of passages at longitudinally spaced locations along the belt, each passage extending through the belt from an aperture in the outer face of the belt, with each belt having a length to engage the bag material, with the apertures of the length of the first belt being arranged in a first generally flat plane, and the apertures of the length of the second belt being arranged in a second generally flat plane, wherein the lengths of said first and second belts are generally parallel and the planes are inclined by an angle greater than 0° but less than 180°, the angle being located in an angle plane extending generally normal to the lengths so that the lengths at least partly face each other to engage the tubular bag material;

a third drive belt located opposite and parallel to the first and second drive belts and having an endless outer surface to engage the tubular bag material, the third belt further having a plurality of passages extending from apertures at longitudinally spaced locations along the third belt, and a length to engage the bag material;

a vacuum gallery operatively associated with each length and to apply a vacuum to the length of the belts so that via the passages the apertures of the lengths have a reduced air pressure to thereby have the tubular bag material urged in contact with the lengths;

a motor assembly to drive each belt so that the lengths move in unison in the same direction to drive the tubular bag material; and a guide for each belt length, each guide engaging its respective length to cause angular deflection thereof about the longitudinal axis of the belt to position the apertures in their respective plane.

2. The assembly of claim 1, wherein each length includes a portion of the outer face of the respective belt so that there are two length portions, which length portions are generally planar, with the portion at said angle plane being generally perpendicular to a radius of said longitudinal axis.

3. The assembly of claim 1, wherein each guide includes a slot along which the belt moves, with each length being located in a respective one of the slots so as to be guided thereby.

4. The assembly of claim 1 wherein the angle is an obtuse angle.

5. A vacuum belt assembly for driving a tubular bag material having a hollow interior and a generally central, longitudinal axis for passing the bag material through a packing machine, the assembly comprising first and second drive belts each having an endless outer face for contacting the tubular bag material, a plurality of passages spaced apart in a longitudinal direction of the belts and extending from the respective outer faces of the first and second belts through the belts, the first and second belts being arranged adjacent to each other for engaging a periphery of the tubular bag material with the respective outer faces of the belts, a guide engaging the belts and deflecting the portions of the outer faces which contact the tubular bag material so that a plane of the portions of the outer faces, and therewith the apertures, lie in planes which are inclined with respect to each other by an angle between 0° and less than 180°, a vacuum source for applying a vacuum to the passages through the belt and therewith to the apertures for holding the tubular bag material to the portions of the outer faces, a motor for driving the belts, whereby the application of a vacuum from the source engages the tubular bag material and carries the tubular bag material passing through the packaging machine, and a third drive belt having an endless outer surface to engage the tubular bag material and a plurality of passages each extending from an aperture in the outer face of the third belt, and a length to engage the bag material, wherein the vacuum source is operatively associated with the length of the third belt and applies a vacuum to the length of the third belt so that apertures of the length of the third belt have reduced air pressure so that the bag material is urged into contact with the length of the third belt.

6. A vacuum belt assembly for driving a tubular bag material having a hollow interior and a generally central, longitudinal axis for passing the bag material through a packing machine, the assembly comprising first and second drive belts each having an endless outer face for contacting the tubular bag material, a plurality of passages spaced apart in a longitudinal direction of the belts and extending from apertures in the respective outer faces of the first and second belts through the belts, the first and second belts being arranged adjacent to each other and generally parallel to said axis for engaging a periphery of the tubular bag material with the respective outer faces of the belts, a guide engaging the belts and deflecting the belts to provide the portions of the outer faces which contact the tubular bag material so that the portions of the outer faces, and therewith the apertures, lie in planes which are inclined with respect to each other by an angle greater than 0° and less that 180°;

a third drive belt located opposite and parallel to the first and second drive belts having an endless outer surface to engage the tubular bag material, the third belt further having a plurality of through passages spaced apart in a longitudinal direction of the belt, and a length to engage the bag material; and a vacuum source for applying a vacuum to the passages through the belt and therewith to the apertures for holding the tubular bag material to the portions of the outer faces, and a motor for driving the belts, whereby the application of a vacuum from the source engages the tubular bag material and carries the tubular bag material passing through the packaging machine.

\* \* \* \* \*